(12) United States Patent
Buell

(10) Patent No.: US 6,267,193 B1
(45) Date of Patent: Jul. 31, 2001

(54) MOTORCYCLE MUFFLER

(75) Inventor: Erik F. Buell, Mukwonago, WI (US)

(73) Assignee: Buell Motorcycle Company, East Troy, WI (US)

( * ) Notice: Subject to any disclaimer, the term of this patent is extended or adjusted under 35 U.S.C. 154(b) by 0 days.

(21) Appl. No.: 09/365,298

(22) Filed: Jul. 30, 1999

(51) Int. Cl.[7] .......................... B60K 11/00; B62K 11/08
(52) U.S. Cl. ..................... 180/225; 180/229; 180/68.1
(58) Field of Search .................... 180/68.1, 219, 180/229, 225

(56) References Cited

U.S. PATENT DOCUMENTS

| | | | |
|---|---|---|---|
| 3,915,249 | * 10/1975 | Garside | 180/229 |
| 4,570,740 | * 2/1986 | Hara | 180/68.1 |
| 4,633,965 | * 1/1987 | Tsurumi et al. | 180/68.1 |
| 4,678,223 | * 7/1987 | Kishi et al. | 180/68.1 |
| 4,830,135 | * 5/1989 | Yamashita | 180/68.1 |
| 5,301,767 | * 4/1994 | Shiohara | 180/219 |
| 5,566,746 | * 10/1996 | Reise | 180/229 |
| 6,105,701 | * 8/2000 | Buell | 180/229 |
| 6,129,167 | * 10/2000 | Mabary | 180/229 |

OTHER PUBLICATIONS

1997 J & P Cycles, p. 20–14.
1998 Yamaha Motorcycle & Riva Accessories, p. 17.

* cited by examiner

Primary Examiner—Brian L. Johnson
Assistant Examiner—Matthew Luby
(74) Attorney, Agent, or Firm—Michael Best & Friedrich LLP

(57) ABSTRACT

A motorcycle includes a muffler defining an air scoop for directing air toward the motorcycle's engine and transmission assembly. The muffler also has a substantially planar upper portion and a lower portion having a convex surface.

13 Claims, 4 Drawing Sheets

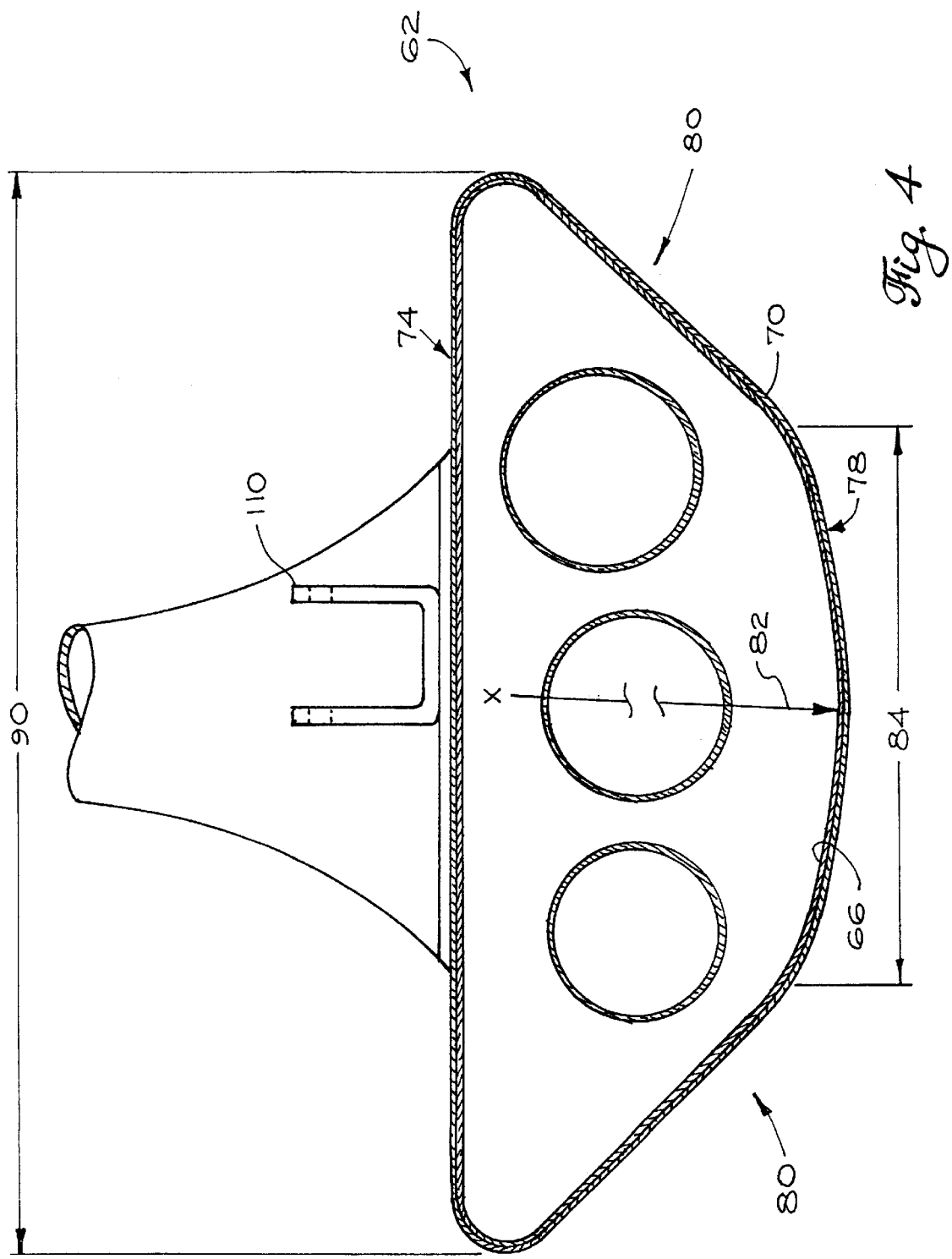

MOTORCYCLE MUFFLER

FIELD OF THE INVENTION

The invention relates to motorcycle mufflers.

BACKGROUND

Prior art motorcycle mufflers often have a substantially circular cross section. The mufflers are usually mounted near the end of each exhaust pipe. Some motorcycle mufflers are mounted near the bottom of the motorcycle frame, beneath the engine and transmission assembly. It is known to provide a fairing or air scoop that is separate from the muffler in front of the muffler to direct a flow of air up toward the engine and transmission assembly.

SUMMARY

Motorcycle mufflers often become very hot during use. Heat radiating from a muffler can cause the engine and transmission housings to heat up. This may result in a variety of undesirable effects, including rider discomfort and accelerated wear of engine components.

The present invention provides a motorcycle having a frame, an engine and transmission assembly interconnected with the frame, and a muffler interconnected with and in communication with the engine's exhaust manifold. The muffler includes a front portion defining an air scoop sized and shaped to direct cooling air between the muffler and the engine and transmission assembly. The air scoop may also be used to direct cooling air toward the engine and transmission assembly while the motorcycle is moving. The invention also provides a motorcycle having a muffler that has a substantially planar top portion, and a lower portion including an outer surface defining a convex curve.

Because the muffler of the present invention directs air toward the engine and transmission assembly, there is no need for an additional fairing that is separate from and mounted in front of the muffler. Other features and advantages of the invention will become apparent to those skilled in the art upon review of the following detailed description, claims, and drawings.

BRIEF DESCRIPTION OF THE DRAWINGS

FIG. 4 is a cross section view taken along line 4—4 in FIG. 3.

Figure 1:
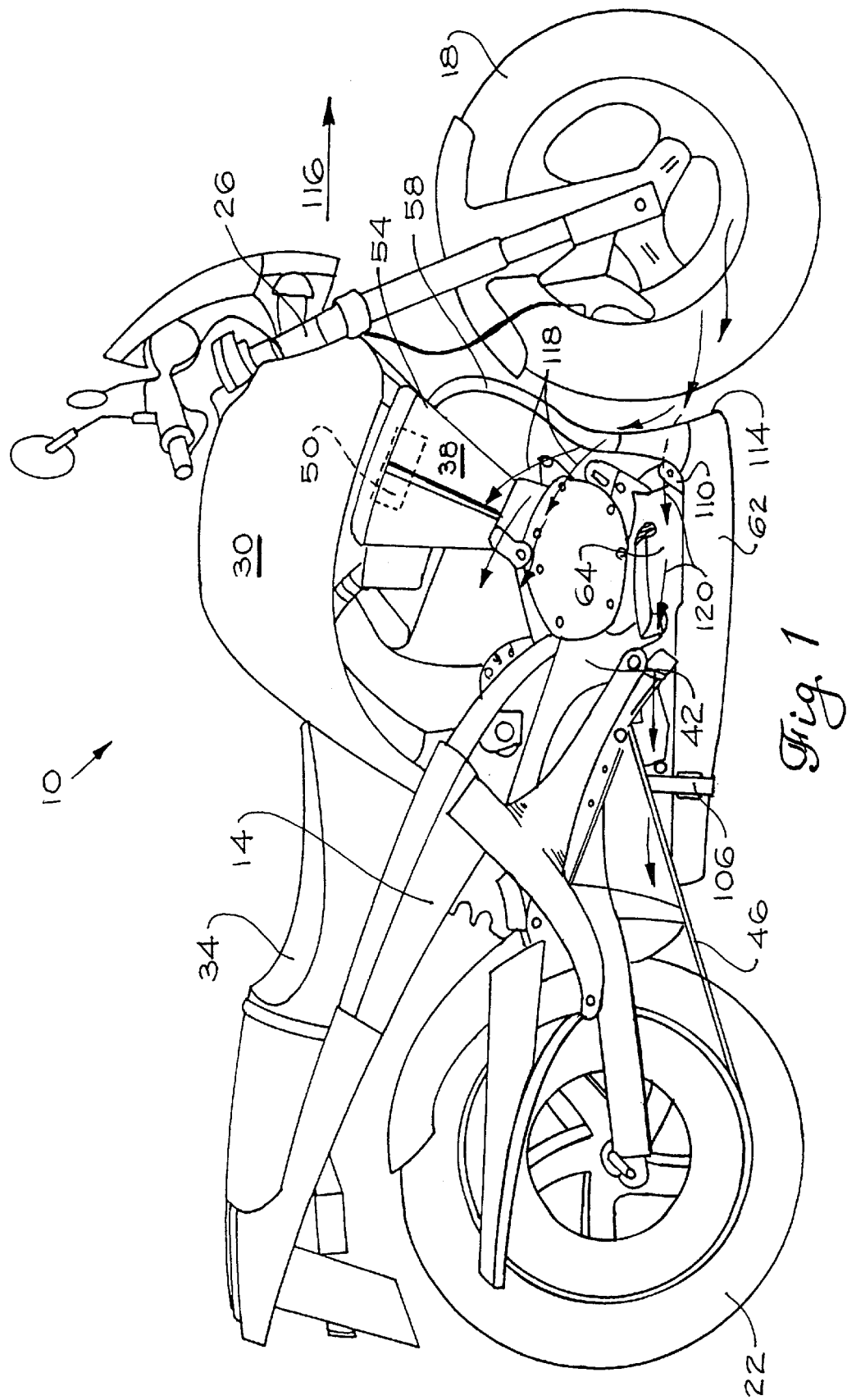
FIG. 1 is a right side elevational view of a motorcycle embodying the present invention.

Before one embodiment of the invention is explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein is for the purpose of description and should not be regarded as limiting. The use of "including" and "comprising" and variations thereof herein is meant to encompass the items listed thereafter and equivalents thereof as well as additional items. The use of "consisting of" and variations thereof herein is meant to encompass only the items listed thereafter.

The use of letters to identify steps of a method or process is simply for identification and is not meant to indicate that the steps should be performed in a particular order.

DETAILED DESCRIPTION

FIG. 1 illustrates a motorcycle 10 including a frame 14, front and rear wheels 18, 22 mounted for rotation with respect to the frame 14, a steering assembly 26 for the front wheel 18, a gas tank 30, and a seat 34. An engine and transmission assembly is mounted to the frame 14. The engine and transmission assembly includes an engine 38 and a transmission 42. The engine 38 drives an output shaft of the transmission 42, which in turn drives the rear wheel 22 through a drive member 46, such as a belt or chain. The illustrated engine 38 is a single-cylinder engine, but the invention may be embodied in a motorcycle having a multiple-cylinder engine. The engine 38 includes a combustion chamber 50 and an exhaust manifold 54.

An exhaust pipe 58 communicates between the exhaust manifold 54 and a muffler 62 mounted below the engine and transmission assembly to carry products of combustion from the combustion chamber 50 to the muffler 62. The illustrated muffler 62 is mounted below the engine and transmission assembly, but may alternatively be mounted substantially anywhere on the motorcycle 10. For example, in a motorcycle having a two-cylinder engine, one muffler 62 may be provided for each of the exhaust pipes 58 associated with the two cylinders, and the mufflers may be positioned on each side of the motorcycle 10. A gap 64 is defined between the engine and transmission assembly and the muffler 62.

Figure 2:
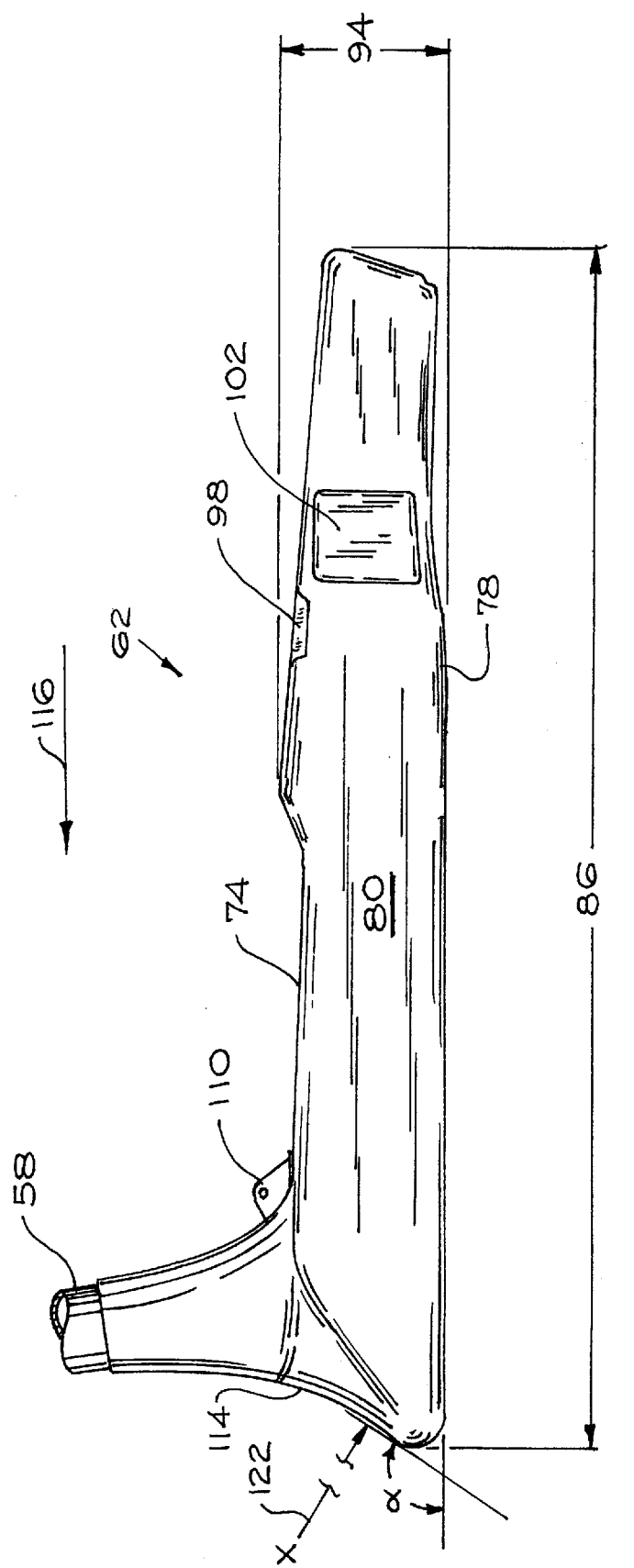
FIG. 2 is a left side elevational view the motorcycle muffler illustrated in FIG. 1.
Figure 3:
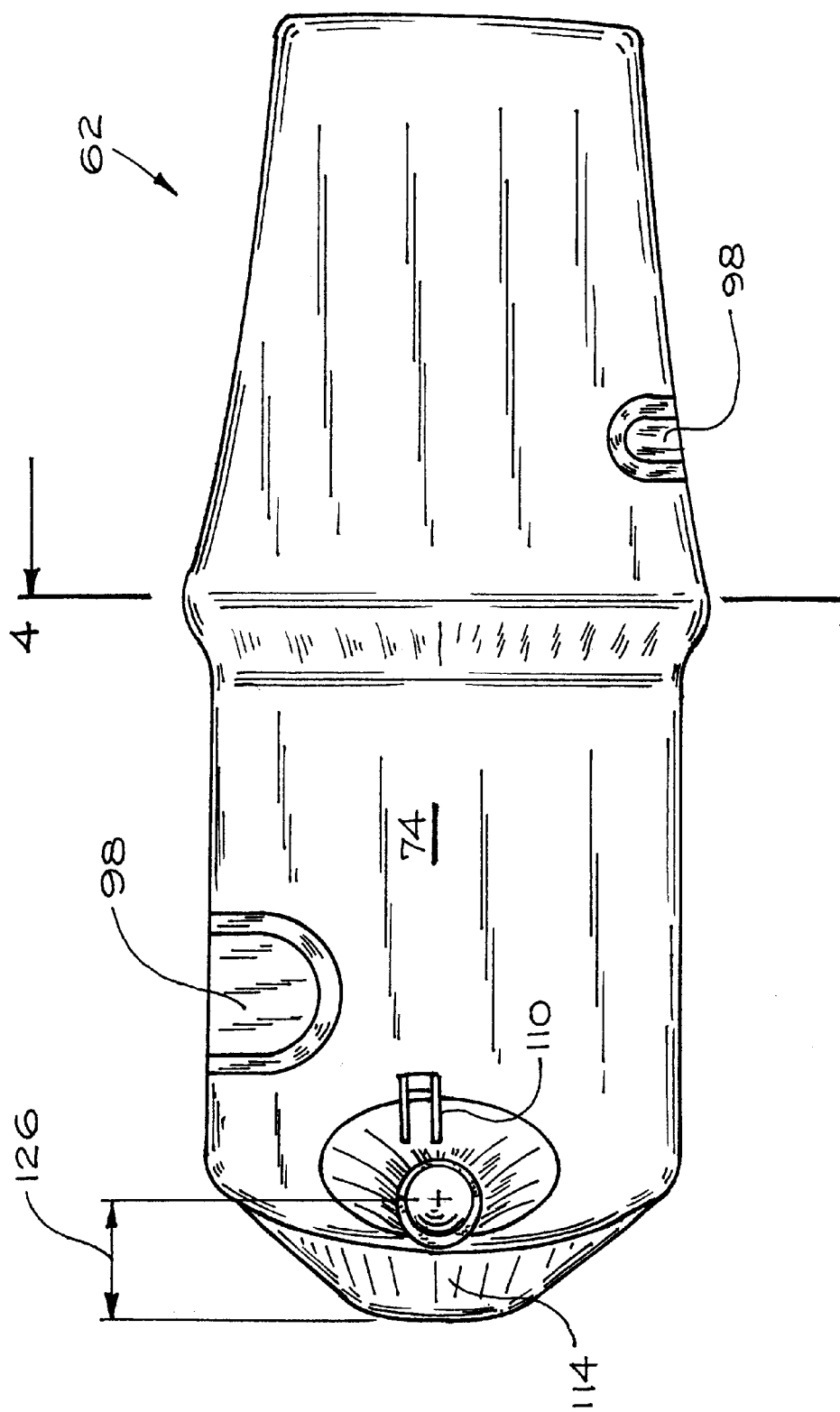
FIG. 3 is a top plan view of the motorcycle muffler of FIG. 2.

FIGS. 2–4 better illustrate the muffler 62. As seen in FIG. 4, the muffler 62 includes an inner wall 66 and an outer wall 70. The muffler 62 includes a substantially planar upper portion 74, a convex lower portion 78, and side portions 80 joining the upper portion and lower portion 78. The outer wall 70 has a radius of curvature 82 of about 8.5 inches in the lower portion 78, and has a width 84 of about 5.5 inches. The width 84 of the lower portion 78 is less than about 75% the width 90 of the upper portion 74. Preferably, the width 84 of the lower portion 78 is about 56% the width 90 of the upper portion 74.

The muffler 62 has a length 86 of about 27 inches, a width 90 of about 10.75 inches, and a height 94 of about 3.75 inches. The width to height ratio is preferably at least 2:1, and more preferably at least 2.75:1. Cut-outs 98 are provided to accommodate various pipes and other motorcycle components near the muffler 62. As seen in FIG. 2, indentations 102 are provided on either side of the muffler 62 to accommodate a mounting strap 106 (FIG. 1), and a mounting bracket 110 is also provided for mounting the muffler 62 to the rest of the motorcycle 10.

The muffler 62 also includes a front portion that defines an air scoop 114. As seen in FIG. 1, the air scoop 114 directs air toward the engine and transmission assembly when the motorcycle 10 is operating and moving in a direction of travel 116. Some of the air, identified by reference numeral 118, is directed up toward the front of the engine and transmission assembly. Some of the air, identified with reference numeral 120, is directed through the gap 64 between the muffler 62 and engine and transmission assembly.

The air scoop 114 defines an angle $\alpha$ (FIG. 2) of between about 110° and about 160° with respect to the direction of travel 116, and has a radius of curvature 122 between about 7 inches and about 11 inches. Preferably, the angle $\alpha$ is about 125°, and the radius of curvature 122 is about 9 inches.

Alternatively, the muffler 62 may be mounted above or to the side of the engine and transmission assembly, provided the air scoop 114 directs air toward the assembly. The air scoop 114 is formed by curvature of the outer wall 70. The air scoop 114 widens from about 4.25 inches at its lower end to about 9.75 inches at its upper end. The air scoop 114 preferably extends forwardly of the exhaust pipe and muffler junction a distance 126 of about 1.5 inches.

What is claimed is:

1. A motorcycle comprising:

a frame;

an engine and transmission assembly interconnected with said frame, said engine having at least one combustion chamber and at least one exhaust manifold; and a muffler interconnected with and in communication with said exhaust manifold, said muffler including a front portion defining an air scoop sized and shaped to direct cooling air between said engine and transmission assembly and said muffler while said motorcycle is moving.

2. The motorcycle of claim 1, wherein said muffler has a muffler wall including an inner wall and an outer wall, and wherein said air scoop is formed by curvature of said outer wall.

3. The motorcycle of claim 1, wherein said air scoop has a width that widens from about 4.25 inches at a lower end, to about 9.75 inches at an upper end.

4. A motorcycle comprising:

a frame;

an engine and transmission assembly interconnected with said frame, said engine having at least one combustion chamber and at least one exhaust manifold; and a muffler interconnected with and in communication with said exhaust manifold, said muffler including a front portion defining an air scoop sized and shaped to direct cooling air toward said engine and transmission assembly while said motorcycle is moving.

5. The motorcycle of claim 4, wherein said air scoop is sized and shaped to direct cooling air between said engine and transmission assembly and said muffler.

6. The motorcycle of claim 4, wherein said muffler is about 27 inches long, about 11 inches wide, and about 4 inches high.

7. The motorcycle of claim 4, wherein said air scoop has a radius of curvature of between about 7 inches and about 11 inches.

8. The motorcycle of claim 7, wherein said radius of curvature is about 9 inches.

9. The motorcycle of claim 4, wherein said air scoop is angled between about 110° and about 160° with respect to a direction of travel of the motorcycle.

10. The motorcycle of claim 9, wherein said air scoop is angled about 125° with respect to the direction of travel of the motorcycle.

11. The motorcycle of claim 4, wherein said muffler has a muffler wall including an inner wall and an outer wall, and wherein said air scoop is formed by curvature of said outer wall.

12. The motorcycle of claim 4, further comprising an exhaust pipe providing communication between said muffler and said exhaust manifold, wherein said exhaust pipe and said muffler are joined at a junction point, and wherein said air scoop extends about 1.5 inches forwardly of said junction point.

13. The motorcycle of claim 4, wherein said air scoop has a width that widens from about 4.25 inches at a lower end, to about 9.75 inches at an upper end.

* * * * *